(No Model.) 2 Sheets—Sheet 2.
G. H. ABEL & J. W. DALY.
HEADING AND REAPING MACHINE.
No. 491,629. Patented Feb. 14, 1893.
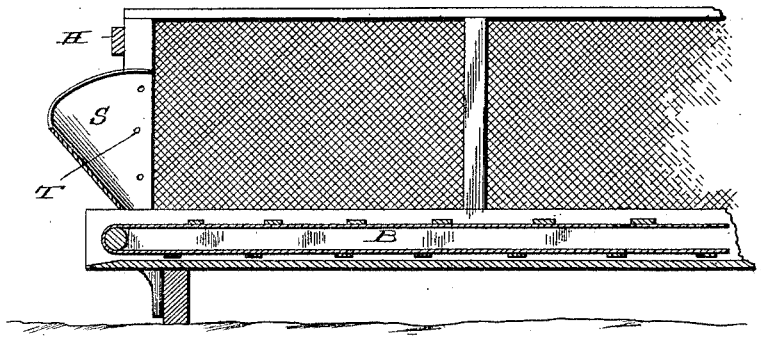
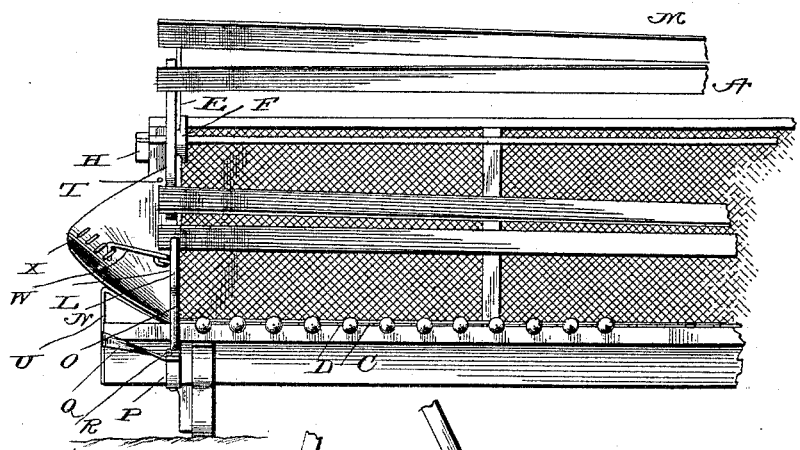
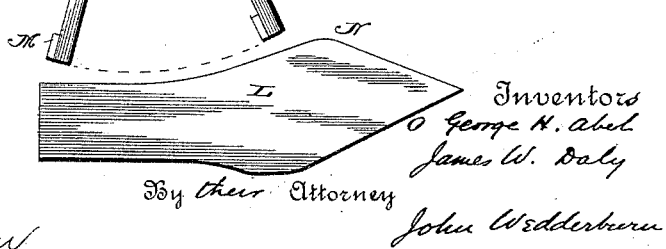
Witnesses
Inventors
George H. Abel
James W. Daly
By their Attorney
John Wedderburn

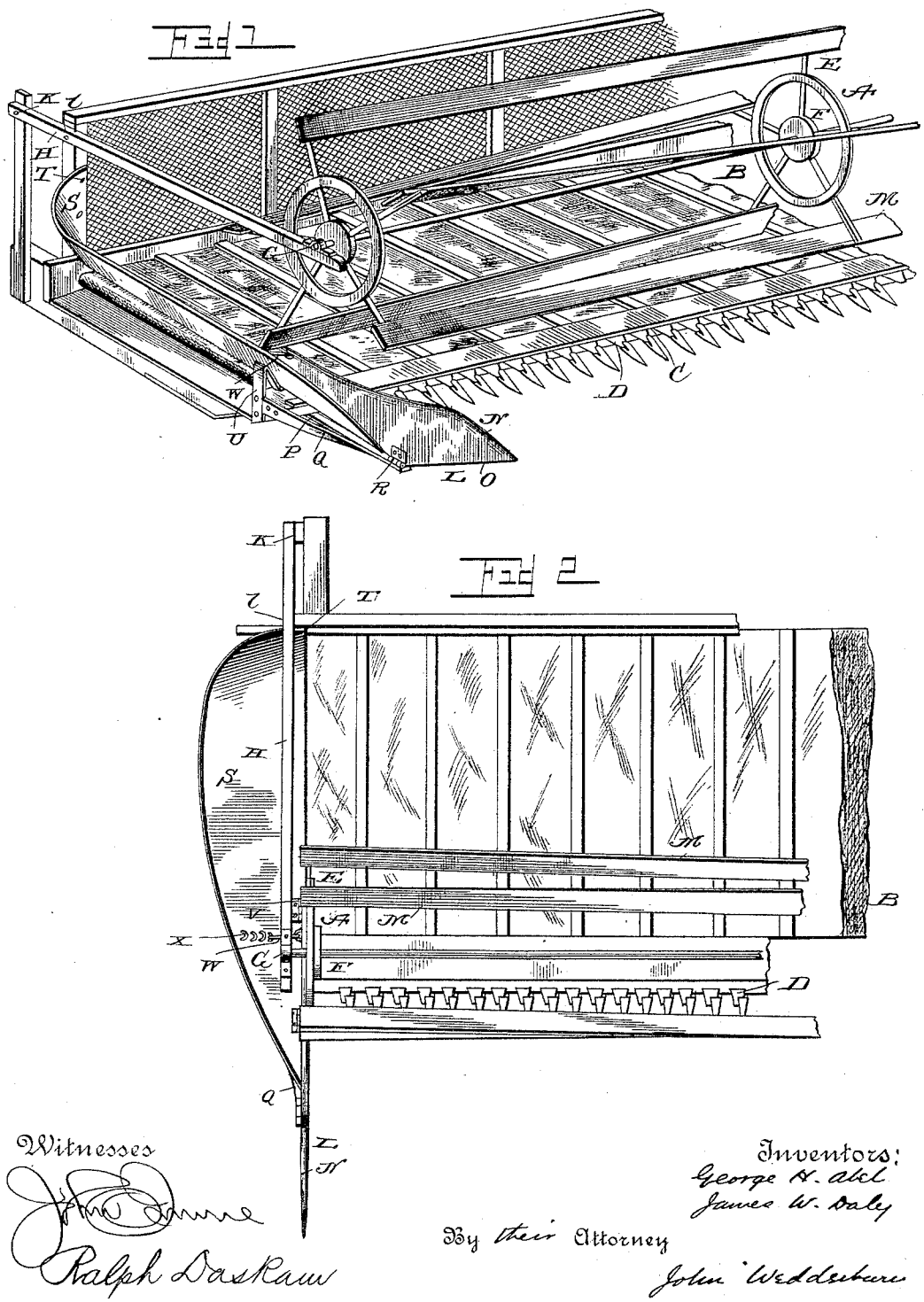

UNITED STATES PATENT OFFICE.

GEORGE H. ABEL AND JAMES W. DALY, OF MAXWELL, CALIFORNIA.

HEADING AND REAPING MACHINE.

SPECIFICATION forming part of Letters Patent No. 491,629, dated February 14, 1893.

Application filed May 28, 1892. Serial No. 434,780. (No model.)

*To all whom it may concern:*

Be it known that we, GEORGE H. ABEL and JAMES W. DALY, of Maxwell, in the county of Colusa and State of California, have invented certain new and useful Improvements in Heading and Reaping Machines; and we do hereby declare the following to be a full, clear, and exact description of the invention, such as will enable others skilled in the art to which it appertains to make and use the same.

Our invention relates to improvements in heading and reaping machines, and its object is to raise, separate, and save lodged or fallen grain, which would otherwise be cut off and dropped to the ground and lost; and our invention consists more particularly in the construction, combination and arrangement of parts hereinafter specified and set forth in the claims.

In the accompanying drawings, Figure 1 is a perspective view of part of a header with our improved divider and fender attached thereto; Fig. 2 is a top plan view of the same; Fig. 3 is a transverse sectional view, Fig. 4 is a front view, and Fig. 5 is a detail side view, showing the divider and part of two arms of the reel.

A represents the revolving reel of a common form of harvester, B the draper or endless conveyer, and C the cutting bar furnished with cutters D.

E are the terminal radii of the revolving reel secured in the disk or hub F which is gudgeoned in the bearings G on the arm or support H secured to the frame of the machine at I and K.

L is our improved divider having its upper edge concaved in the rearward part to conform to the arc of the circle described by the revolving beaters M so as to permit these beaters to approach close to the edge of the divider, and sweep all the grain into the conveyer. In the forward portion of the divider the upper and lower edges N and O converge to form a point, so as more effectually to divide the grain.

P and Q are iron braces secured to the under side and end respectively of the cutter bar, and at their forward ends supporting the divider L which is hinged thereon at R. The brace Q also serves as a guard for the cutter. S is our improved fender having its upper edge inclined in a suitable curve from front to rear, so as to raise the grain that is hanging in toward the header, and crowd it smoothly out of the way without mutilating the heads. The rear portion of the fender is bent round and secured at T to the frame of the network at the rear of the draper, thus entirely inclosing the grain, so that there is no possibility of its falling outside and being wasted. The front portion of the fender is supported on a bracket or stay U secured to the end of the cutter bar. The divider L is also secured at its lower edge to the fender S by hinges V, which with the hinge R permit the divider to assume an oblique position, which is sometimes desirable when harvesting light-standing grain. In order to secure the divider in such position we attach to the divider a hooked finger W which engages one of the eyes or staples X on the fender. But any other suitable means for holding the divider in any desired obliquity may be employed.

It will be understood that we do not limit ourselves to any special form of harvesting or heading machine, as our device may be attached to any machine having the main features above described, however much it may differ in details therefrom.

Having thus fully described our invention, what we claim and desire to secure by Letters Patent is;

1. In a machine of the class described, the combination of an outwardly sloping fender, a pointed divider hinged at its lower edge to said fender, and means for securing said divider at any desired angle with regard to said fender, substantially as described.

2. In a machine of the class described, the combination of an outwardly sloping fender, a pointed divider hinged at its lower edge to said fender, a hooked finger carried by said divider, and eyes or staples secured to said fender, and adapted to engage with said finger, substantially as described.

3. In a machine of the class described, the combination of rollers, an endless belt or conveyer on said rollers, and a fender secured to the frame of the machine above the outer roller, or thereabout, inclined outwardly from the bottom up, rising gradually from front to rear in its forward portion, and bent inwardly at its rear portion, substantially as described.

4. In a machine of the class described, the combination of a revolving reel, with a divider below said reel, having its upper edge concaved to conform to the curvature of revolution of said reel, in combination with a fender, said divider being hinged to said fender substantially as described.

5. In a machine of the class described, the combination of a pointed divider hinged at its lower edge to a fixed portion of the machine, and a hooked finger adapted to engage one of a series of eyes or staples on the fender, substantially as and for the purpose set forth.

In testimony whereof we have signed this specification in the presence of two subscribing witnesses.

GEORGE H. ABEL.
JAMES W. DALY.

Witnesses:
E. F. PEAST,
THOS. P. HARDEN.